United States Patent
Knuckey et al.

(10) Patent No.: US 10,326,156 B2
(45) Date of Patent: Jun. 18, 2019

(54) FUEL CELLS FOR USE AT ELEVATED TEMPERATURES AND PRESSURES

(71) Applicant: University of Chester, Chester (GB)

(72) Inventors: Kathryn Jane Knuckey, Cheshire (GB); Andrew Martin Creeth, Cheshire (GB); Nicholas de Brissac Baynes, Cheshire (GB); David Rochester, Cheshire (GB); Brian Clarkson, Cheshire (GB)

(73) Assignee: University of Chester, Chester (GB)

( * ) Notice: Subject to any disclaimer, the term of this patent is extended or adjusted under 35 U.S.C. 154(b) by 418 days.

(21) Appl. No.: 14/409,438

(22) PCT Filed: Jun. 25, 2013

(86) PCT No.: PCT/GB2013/051675
§ 371 (c)(1),
(2) Date: Dec. 18, 2014

(87) PCT Pub. No.: WO2014/001786
PCT Pub. Date: Jan. 3, 2014

(65) Prior Publication Data
US 2015/0180071 A1     Jun. 25, 2015

(30) Foreign Application Priority Data
Jun. 27, 2012   (GB) .................................. 1211435.1

(51) Int. Cl.
*H01M 8/06* (2016.01)
*H01M 8/08* (2016.01)
(Continued)

(52) U.S. Cl.
CPC ........ *H01M 8/0693* (2013.01); *C01G 39/006* (2013.01); *H01M 8/086* (2013.01);
(Continued)

(58) Field of Classification Search
CPC ........ H01M 8/06; H01M 8/20; H01M 8/0693; H01M 8/086; H01M 8/1018; H01M 8/188
See application file for complete search history.

(56) References Cited

U.S. PATENT DOCUMENTS 3,607,420 A * 9/1971 Cutler ..................... H01M 8/20
429/418
3,994,392 A * 11/1976 Kajiyama .............. B65D 81/00
148/253

(Continued)

FOREIGN PATENT DOCUMENTS

| WO | 2007/122431 A1 | 11/2007 |
| WO | 2009/040577 A1 | 4/2009 |
| WO | 2012/175997 A2 | 12/2012 |

OTHER PUBLICATIONS

Grate, John H., Keggin phosphomolybdobanadates for catalytic oxidations, Journal of Molecular Catalysis, Dec. 1, 1996, vol. 114, No. 1-3, pp. 93-101.

(Continued)

*Primary Examiner* — Kenneth J Douyette
(74) *Attorney, Agent, or Firm* — Knobbe, Martens, Olson & Bear, LLP

(57) ABSTRACT

This invention provides a redox fuel cell comprising an anode and a cathode separated by an ion selective polymer electrolyte membrane; means for supplying a fuel to the anode region of the cell; means for supplying an oxidant to the cathode region of the cell; means for providing an electrical circuit between the anode and the cathode; a non-volatile catholyte solution flowing in fluid communication with the cathode, the catholyte solution comprising a polyoxometallate redox couple being at least partially reduced at the cathode in operation of the cell, and at least partially re-generated by reaction with the oxidant after such (Continued)

reduction at the cathode, the catholyte solution further comprising vanadium species that result from the speciation of the polyoxometallate at an elevated temperature and/or pressure.

24 Claims, 8 Drawing Sheets

(51) Int. Cl.
*H01M 8/18* (2006.01)
*C01G 39/00* (2006.01)
*H01M 8/086* (2016.01)
*H01M 8/1018* (2016.01)
*H01M 8/20* (2006.01)

(52) U.S. Cl.
CPC ......... *H01M 8/1018* (2013.01); *H01M 8/188* (2013.01); *H01M 8/20* (2013.01); *H01M 2008/1095* (2013.01); *H01M 2300/0008* (2013.01); *Y02E 60/528* (2013.01)

(56) References Cited

U.S. PATENT DOCUMENTS

| | | | | |
|---|---|---|---|---|
| 4,396,687 | A | | 8/1983 | Kummer et al. |
| 5,859,300 | A | * | 1/1999 | Jalett .................... C07D 333/36 549/68 |
| 6,008,393 | A | * | 12/1999 | Sablong .................. C07F 17/02 548/402 |
| 6,169,192 | B1 | * | 1/2001 | Pugin .................... B01J 31/1658 502/154 |
| 2008/0274385 | A1 | * | 11/2008 | Creeth ................ H01M 4/8652 429/492 |
| 2011/0048962 | A1 | * | 3/2011 | Reece ....................... C25B 1/04 205/633 |

OTHER PUBLICATIONS

Miras et al, A novel series of vanadium-sulfite polyoxometalates: synthesis, structural, and physical studies, Chemistry, A European Journal, vol. 11, pp. 2295-2306, Apr. 8, 2005.

Search and Examination Report from corresponding GB Application No. GB1211435.1 dated Aug. 29, 2012.

* cited by examiner

FUEL CELLS FOR USE AT ELEVATED TEMPERATURES AND PRESSURES

CROSS-REFERENCE TO RELATED APPLICATIONS

This application is the U.S. National Phase under 35 U.S.C. § 371 of International Application PCT/GB2013/051675, filed on Jun. 25, 2013, which claims priority to U.K. Application No. GB 1211435.1, filed Jun. 27, 2012. The disclosures of the above-described applications are hereby incorporated by reference in their entirety.

The present invention relates to fuel cells for use at elevated temperatures and pressures, in particular to indirect or redox fuel cells which have applications in microfuel cells for electronic and portable electronic components, and also in larger fuel cells for the automotive industry. The invention also relates to certain catholyte solutions for use in such fuel cells and the use of the cells themselves.

Fuel cells have been known for portable applications such as automotive and portable electronics technology for very many years, although it is only in recent years that fuel cells have become of serious practical consideration. In its simplest form, a fuel cell is an electrochemical energy conversion device that converts fuel and oxidant into reaction product(s), producing electricity and heat in the process. In one example of such a cell, hydrogen is used as fuel, air or oxygen as an oxidant and the product of the reaction is water. The gases are fed respectively into catalysing, diffusion-type electrodes separated by a solid or liquid electrolyte which carries electrically charged particles between the two electrodes. In an indirect or redox fuel cell, the oxidant (and/or fuel in some cases) is not reacted directly at the electrode but instead reacts with the reduced form (oxidized form for fuel) of a redox couple to oxidise it and this oxidised species is fed to the cathode.

An acknowledged problem concerning electrochemical fuel cells is that the theoretical potential of a given electrode reaction under defined conditions can be calculated but never completely attained. Imperfections in the system inevitably result in a loss of potential to some level below the theoretical potential attainable from any given reaction. Previous attempts to reduce such imperfections include the selection of catholyte additives which undergo oxidation-reduction reactions in the catholyte solution. For example, U.S. Pat. No. 3,294,588 discloses the use of quinones and dyes in this capacity. Another redox couple which has been tried is the vanadate/vanadyl couple, as disclosed in U.S. Pat. No. 3,279,949.

Several types of proton exchange membrane fuel cells exist. For example, in U.S. Pat. No. 4,396,687 a fuel cell is disclosed which comprises regenerable anolyte and catholyte solutions. The anolyte solution is one which is reduced from an oxidised state to a reduced state by exposure of the anolyte solution to hydrogen. According to U.S. Pat. No. 4,396,687, preferred anolyte solutions are tungstosilicic acid ($H_4SiW_{12}O_{40}$) or tungstophosphoric acid ($H_3PW_{12}O_{40}$) in the presence of a catalyst.

The preferred catholyte solution of U.S. Pat. No. 4,396,687 is one which is re-oxidised from a reduced state to an oxidized state by direct exposure of the catholyte solution to oxygen. The catholyte of U.S. Pat. No. 4,396,687 includes a mediator component comprising a solution of $VOSO_4$. The mediator functions as an electron sink which is reduced from an oxidation state of $V^{(v)}$ to $V^{(IV)}$. The catholyte also includes a catalyst for regenerating the mediator to its oxidised state, $(VO_2)_2SO_4$. The catalyst present in the catholyte of U.S. Pat. No. 4,396,687 is a polyoxometallate (POM) solution, namely $H_5PMo_{12}V_2O_{40}$.

Besides U.S. Pat. No. 4,396,687, a number of other attempts to use oxometallate catalysts have been made. For example, in U.S. Pat. No. 5,298,343, cathode systems comprising solid metal catalysts, oxometallates and metallic acids, such as molybdic acid are disclosed.

In addition, WO 96/31912 describes the use of embedded polyoxometallates in an electrical storage device. The redox nature of the polyoxometallate is employed in conjunction with carbon electrode material to temporarily store electrons.

The basic structure of the fuel cells used with the present invention is disclosed in EP1866997. The fuel cells disclosed herein comprise an anode and a cathode separated by an ion selective polymer electrolyte membrane, the cathode comprising a cathodic material and a proton-conducting polymeric material; means for supplying a fuel to the anode region of the cell; means for supplying an oxidant to the cathode region of the cell; means for providing an electrical circuit between the anode and the cathode; a non-volatile redox couple in solution in flowing fluid communication with the cathode, the redox couple being at least partially reduced at the cathode in operation of the cell, and at least partially re-generated by reaction with the oxidant after such reduction at the cathode. The examples disclose that the catholyte is maintained at 50° C.

EP1999811 discloses the redox fuel cells as used in the present invention, in combination with a polyoxometallate. This application discloses fuel cells that comprise an anode and a cathode separated by an ion selective polymer electrolyte membrane; means for supplying a fuel to the anode region of the cell; means for supplying an oxidant to the cathode region of the cell; means for providing an electrical circuit between the anode and the cathode; a non-volatile catholyte solution flowing in fluid communication with the cathode, the catholyte solution comprising a polyoxometallate redox couple being at least partially reduced at the cathode in operation of the cell, and at least partially re-generated by reaction with the oxidant after such reduction at the cathode, the catholyte solution comprising at least about 0.075M of the said polyoxometallate.

Zhizhina, E. G.; Simonova, M. V.; Odyakov, V. F.; Matveev, K. I. *Applied Catalysis A: General* 2007, 319, 91-97 discloses an increase in rate of redox potential of polyoxometallates at increased temperatures (100, 120, 130, 140, 150, 160° C.) under a $P_{O2}$ of 4 atm for chemical synthesis applications. The paper then goes on to state that "increasing temperature, rate and depth of regeneration of any HPA by dioxygen highly grow". However, the same paper also indicates that temperatures above 140° C. and preferably above 160° C. are beneficial. The aqueous polyoxometallate solutions disclosed herein are complex equilibrium systems containing different anions and cations.

Odyakov, V. F.; Zhizhina, E. G.; Maksimovskaya, R. I. *Applied Catalysis A: General* 2008, 342, 126-130 discloses that the regeneration of the polyoxometallate materials above requires "harder conditions" of 150-170° C. and $P_{O2}$ of 2-4 atm. Zhizhina, E. G.; Odyakov, V. F. *Applied Catalysis A: General* 2009, 358, 254-258 describes a temperature of 150-160° C. being required for the re-oxidation of the polyoxometallate catalyst to proceed efficiently. Further, the regeneration conditions for the polyoxometallate catalyst used are a temperature of 170° C. and a $P_{O2}$ of 4 atm.

The prior art fuel cells all suffer from one or more of the following disadvantages: they are inefficient; they are expensive and/or expensive to assemble; they use expensive and/or environmentally unfriendly materials; they yield inadequate and/or insufficiently maintainable current densities and/or cell potentials; they are too large in their construction; they operate at too high a temperature; they produce unwanted by-products and/or pollutants and/or noxious materials; and they have not found practical, commercial utility in portable applications such as automotive and portable electronics.

It is an object of the present invention to overcome or ameliorate one or more of the aforesaid disadvantages.

Accordingly, the present invention provides a redox fuel cell comprising an anode and a cathode separated by an ion selective polymer electrolyte membrane; means for supplying a fuel to the anode region of the cell; means for supplying an oxidant to the cathode region of the cell; means for providing an electrical circuit between the anode and the cathode; a catholyte solution comprising at least one non-volatile catholyte component flowing in fluid communication with the cathode, the catholyte solution comprising a polyoxometallate redox couple being at least partially reduced at the cathode in operation of the cell, and at least partially re-generated by reaction with the oxidant in a regeneration zone after such reduction at the cathode, wherein the catholyte solution further comprises one or more vanadium species that result from speciation of the polyoxometallate at an elevated temperature and/or pressure.

By speciation, it is meant that the vanadium species at one point was part of a polyoxometallate structure.

The inventors have surprisingly found that operation of the fuel cell at an increased temperature and/or pressure results in an improved performance. Conventional thinking was that the optimum temperature for operation was 80° C., as performance was thought to decrease at higher temperatures, due to decrease of oxygen solubility to zero as the boiling point of the catholyte is approached. However, the inventors have found evidence that this is not the case. Surprisingly, they have found that increasing the temperature and/or pressure causes speciation of the polyoxometallate species, which increases the regeneration rate of the polyoxometallate. This causes improvements in steady state performance as the catholyte is less reduced under the same load. This also increases the redox potential of the polyoxometallate, which results from a dynamic equilibrium between oxidation (occurring via regeneration) and reduction (occurring at the fuel cell electrode).

Increasing the temperature of the fuel cell is thought to have various advantages, such as reducing the catholyte viscosity, increasing ionic conductivity in the catholyte, increasing ionic conductivity in the membrane and increasing diffusion rates for all species. Increased pressure is thought to increase the maximum concentration of dissolved oxygen, thereby improving oxidation rates.

Preferably, the speciation of the polyoxometallate occurs in situ.

The elevated temperature is preferably above 80° C. and even more preferably above 100° C. However, certain membranes used in the fuel cell of the present invention may become damaged at above 120° C. The elevated pressure is preferably above ambient pressure. More preferably, the elevated pressure is around 2 barG pressure. The elevated pressure is also preferably below 2.5 barG. BarG pressure means gauge pressure and is defined as the pressure above ambient (atmospheric) pressure. In a further embodiment, both elevated temperature and pressure are used. This provides further benefits as the increase in pressure allows for a greater increase in temperature than would otherwise be possible, as the catholyte temperature is limited by its boiling point. The elevated temperature is therefore preferably below the boiling point for the catholyte solution.

The elevated temperature is preferably in the regeneration zone and/or in the cathode/anode region of the cell. More preferably, the elevated temperature is in the regeneration zone. Further, the elevated pressure is preferably in the regeneration zone and/or in the cathode/anode region of the cell. More preferably, the elevated pressure is in the regeneration zone.

The polyoxometallate may be represented by the formula:

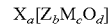

$$X_a[Z_bM_cO_d]$$

wherein:

X is selected from hydrogen, alkali metals, alkaline earth metals, ammonium and combinations of two or more thereof;

Z is selected from B, P, S, As, Si, Ge, Ni, Rh, Sn, Al, Cu, I, Br, F, Fe, Co, Cr, Zn, $H_2$, Te, Mn and Se and combinations of two or more thereof;

M comprises vanadium and optionally one or more of Mo, W, Nb, Ta, Mn, Fe, Co, Cr, Ni, Zn Rh, Ru, Tl, Al, Ga, In and other metals selected from the $1^{st}$, $2^{nd}$ and $3^{rd}$ transition metal series and the lanthanide series, and combinations of two or more thereof;

a is a number of X necessary to charge balance the $[Z_bM_cO_d]$ anion;

b is from 0 to 20;

c is from 1 to 40; and d is from 1 to 180.

Preferred ranges for b are from 0 to 15, more preferably 0 to 10, still more preferably 0 to 5, even more preferably 0 to 3, and most preferably 0 to 2.25.

Preferred ranges for c are from 5 to 20, more preferably from 10 to 18, and most preferably 12.

Preferred ranges for d are from 30 to 70, more preferably 34 to 62, and most preferably 40 to 50.

The values for a, b, c and d are not necessarily integers.

A combination of vanadium and molybdenum is particularly preferred for M.

Also preferred is a combination of vanadium and tungsten.

Phosphorus is particularly preferred for Z.

A combination of hydrogen and an alkali metal and/or alkaline earth metal is particularly preferred for X. One such preferred combination is hydrogen and sodium.

It was surprisingly found that the use of acid polyoxometallate species, such as $H_{10}P_2V_4Mo_8O_{44}$ and $H_{10.75}P_{2.25}Mo_8V_4O_{45}$, resulted in an improved performance at increased temperatures and pressures. It was previously known that these polyoxometallates had a relatively poor performance in standard fuel cells. However, a dramatic improvement in performance is seen when used in the fuel cells of the present invention. Further, acid polyoxometallates such as $H_{10}P_2V_4Mo_8O_{44}$ and $H_{10.75}P_{2.25}Mo_8V_4O_{45}$ were found to demonstrate a better performance than other known polyoxometallate species in fuel cells of the present invention.

The acid polyoxometallate species for use in the present invention may be of the formula described above, wherein X consists of hydrogen.

Acid polyoxometallates that may be used in the fuel cell of the present invention include $H_9PSV_4Mo_8O_{44}$, $H_{15}PS_4V_4Mo_8O_{56}$, $H_{16}P_4V_4Mo_8O_{52}$, $H_7PSV_5Mo_8O_{45}$ and $H_7PS_3V_7Mo_8O_{55}$.

Preferably, the acid polyoxometallate may be represented by the formula:

wherein:
a is a number of H necessary to charge balance the $[P_zMo_yV_xO_b]$ anion;
z is from 1 to 3;
x is from 1 to 12;
y is from 7 to 20; and
b is from 40 to 89.

Possible acid polyoxometallates according to the above formula for use in the fuel cell of the present invention include $H_{10}P_2V_4Mo_8O_{44}$, $H_{10.75}P_{2.25}V_4Mo_8O_{45}$ $H_7PV_4Mo_9O_{42.5}$, $H_{10}P_2V_4Mo_9O_{46.5}$, $H_7PV_4Mo_8O_{40}$, $H_{11.25}P_{2.25}V_{4.5}Mo_{7.5}O_{45}$, $H_{9.25}P_{1.75}V_4Mo_8O_{43}$, $H_{10.25}P_{1.75}V_5Mo_{7.5}O_{44.25}$, $H_{9.75}P_{1.75}V_{4.5}Mo_8O_{44.25}$, $H_{11.25}P_{2.25}V_{4.5}Mo_8O_{46.25}$, $H_{11.75}P_{2.25}V_5Mo_{7.5}O_{46.25}$, $H_{9.75}P_{1.75}V_{4.5}Mo_{7.5}O_{43}$ and $H_{13}P_3V_4Mo_8O_{40}$.

The polyoxometallate species used in the fuel cell of the present invention preferably has a molar ratio of any non-hydrogen cations to vanadium of between 0 and 1. More preferably, the molar ratio is 0. The polyoxometallate is therefore preferably an acid polyoxometallate.

Specific examples of polyoxometallates include $H_7PMo_8V_4O_{40}$, $H_{12}P_3Mo_{18}V_7O_{85}$, $H_{10}P_2V_4Mo_8O_{44}$ and $H_{10.75}P_{2.25}V_4Mo_8O_{45}$. In addition, a mixture of these or other polyoxometallate catalysts is also envisaged. Preferably, the polyoxometallate has between 2 and 6 vanadium centres.

The concentration of the polyoxometallate in the catholyte solution is preferably at least about 0.08M, more preferably at least about 0.1M, still more preferably at least about 0.125M and most preferably at least about 0.15M.

In one preferred embodiment of the invention, the ion selective PEM is a cation selective membrane which is selective in favour of protons versus other cations.

The cation selective polymer electrolyte membrane may be formed from any suitable material, but preferably comprises a polymeric substrate having cation exchange capability. Suitable examples include fluororesin-type ion exchange resins and non-fluororesin-type ion exchange resins. Fluororesin-type ion exchange resins include perfluorocarboxylic acid resins, perfluorosulfonic acid resins and the like. Perfluorosulfonic acid resins are preferred, for example "Nafion" (Du Pont Inc.), "Flemion" (Asahi Gas Ltd), "Aciplex" (Asahi Kasei Inc) and the like. Non-fluororesin-type ion exchange resins include polyvinyl alcohols, polyalkylene oxides, styrene-divinylbenzene ion exchange resins and the like, and metal salts thereof. Preferred non-fluororesin-type ion exchange resins include polyalkylene oxide-alkali metal salt complexes. These are obtainable by polymerizing an ethylene oxide oligomer in the presence of lithium chlorate or another alkali metal salt, for example. Other examples include phenolsulphonic acid, polystyrene sulphonic, polytriflurostyrene sulphonic, sulphonated trifluorostyrene, sulphonated copolymers based on α,β,β trifluorostyrene monomer and radiation-grafted membranes. Non-fluorinated membranes include sulphonated poly(phenylquinoxalines), poly (2,6 diphenyl-4-phenylene oxide), poly(arylether sulphone), poly(2,6-diphenylenol), acid-doped polybenzimidazole, sulphonated polyimides, styrene/ethylene-butadiene/styrene triblock copolymers, partially sulphonated polyarylene ether sulphone, partially sulphonated polyether ether ketone (PEEK) and polybenzyl suphonic acid siloxane (PBSS).

The proton exchange membrane fuel cell of the present invention may work in the following way:

a) $H^+$ ions are formed at an anode situated adjacent to a proton exchange membrane;
b) the catholyte with its redox couple in an oxidised state is supplied to a cathode situated oppositely adjacent to the proton exchange membrane;
c) the catholyte is allowed to become reduced upon contact with the cathode concomitantly with $H^+$ ions passing through the membrane to balance charge;
d) the catholyte may be passed from the cathode to a reoxidation zone wherein the catholyte is reoxidised; and
e) the catholyte may then be passed from the reoxidation zone to the catholyte reservoir.

In a preferred embodiment, the catholyte is supplied from a catholyte reservoir.

The cell may be cyclic and the catholyte can be repeatedly oxidised and reduced without having to be replaced.

The fuel cell of the invention may comprise a reformer configured to convert available fuel precursor such as LPG, LNG, gasoline or low molecular weight alcohols into a fuel gas (eg hydrogen) through a steam reforming reaction. The cell may then comprise a fuel gas supply device configured to supply the reformed fuel gas to the anode chamber It may be desirable in certain applications of the cell to provide a fuel humidifier configured to humidify the fuel, eg hydrogen. The cell may then comprise a fuel supply device configured to supply the humidified fuel to the anode chamber.

An electricity loading device configured to allow the fuel cell to provide electric power may also be provided in association with the fuel cell of the invention.

Preferred fuels include hydrogen; low molecular weight alcohols, aldehydes and carboxylic acids; sugars and biofuels as well as LPGLNG or gasoline.

Preferred oxidants include air, oxygen and peroxides

The anode in the redox fuel cell of the invention may for example be a hydrogen gas anode or a direct methanol anode; other low molecular weight alcohols such as ethanol, propanol, dipropylene glycol; ethylene glycol; aldehydes formed from these; and acid species such as formic acid, ethanoic acid etc. In addition, the anode may be formed from a bio-fuel cell type system where a bacterial species consumes a fuel and either produces a mediator which is oxidized at the electrode, or the bacteria themselves are adsorbed at the electrode and directly donate electrons to the anode.

The cathode in the redox fuel cell of the invention may comprise as cathodic material carbon, gold, platinum, nickel or a metal oxide species. However, it is preferable that expensive cathodic materials are avoided and therefore preferred cathodic materials include carbon, nickel and metal oxide. One preferable material for the cathodes is reticulated vitreous carbon or carbon fibre based electrodes such as carbon felt. Another is nickel foam. The cathodic material may be constructed from a fine dispersion of particulate cathodic material, the particulate dispersion being held together by a suitable adhesive, or by a proton conducting polymeric material. The cathode is designed to create maximum flow of catholyte solution to the cathode surface. Thus it may consist of shaped flow regulators or a three dimensional electrode; the liquid flow may be managed in a flow-by arrangement where there is a liquid channel adjacent to the electrode, or in the case of the three dimensional electrode, where the liquid is forced to flow through the electrode. It is intended that the surface of the electrode is also the electrocatalyst, but it may be beneficial to adhere the electrocatalyst in the form of deposited particles on the surface of the electrode.

The redox couple flowing in solution in the cathode chamber in operation of the cell is used in the invention as a catalyst for the reduction of oxygen in the regeneration chamber, in accordance with the following (wherein Sp is the redox couple species).

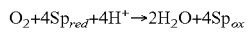

$$O_2 + 4Sp_{red} + 4H^+ \rightarrow 2H_2O + 4Sp_{ox}$$

The polyoxometallate redox couple, as well as any other ancillary redox couple, utilised in the fuel cell of the invention should be non-volatile and is preferably soluble in aqueous solvent. Preferred redox couples should react with the oxidant at a rate effective to generate a useful current in the electrical circuit of the fuel cell and react with the oxidant such that water is the ultimate end product of the reaction.

The fuel cell of the invention requires the presence of at least about 0.075M of a polyoxometallate species in the catholyte solution. However, in some circumstances it may also be possible to include other redox couples in the catholyte solution in addition to the polyoxometallate species. There are many suitable examples of such ancillary redox couples, including ligated transition metal complexes and other polyoxometallate species. Specific examples of suitable transition metals ions which can form such complexes include manganese in oxidation states II-V, iron I-IV, copper I-III, cobalt I-III, nickel I-III, chromium (II-VII), titanium II-IV, tungsten IV-VI, vanadium II-V and molybdenum II-VI. Ligands can contain carbon, hydrogen, oxygen, nitrogen, sulphur, halides and/or phosphorus. Ligands may be chelating complexes such as Fe/EDTA and Mn/EDTA, NTA and 2-hydroxyethylenediaminetriacetic acid, or non-chelating such as cyanide. The catholyte solution of the present invention may also be substantially free from any ancilliary redox species other than the vanadium species.

The fuel cell of the invention may operate straightforwardly with a redox couple catalysing in operation of the fuel cell the reduction of oxidant in the cathode chamber. However, in some cases, and with some redox couples, it may be necessary and/or desirable to incorporate a catalytic mediator in the cathode chamber.

Also provided is a catholyte solution for use in a redox fuel cell as outlined above.

Another aspect of the present invention provides a redox fuel cell, as outlined above, wherein during operation, all or part of the fuel cell is maintained at an elevated temperature and/or pressure. The elevated temperature is preferably above 80° C. and is more preferably above 100° C. However, the elevated temperature is preferably no more than 120° C. The elevated pressure is preferably above ambient pressure, and more preferably around 2 barG. The elevated pressure is also preferably below 2.5 barG. In one embodiment, both an elevated temperature and pressure is used.

The elevated temperature may be in the regeneration zone and/or in the cathode/anode region of the cell. Preferably, the elevated temperature is in the regeneration zone. Further, the elevated pressure may be in the regeneration zone and/or in the cathode/anode region of the cell. Preferably, the elevated pressure is in the regeneration zone.

Various aspects of the present invention will now be more particularly described with reference to the following figures which illustrate embodiments of the present invention:

Figure 7:
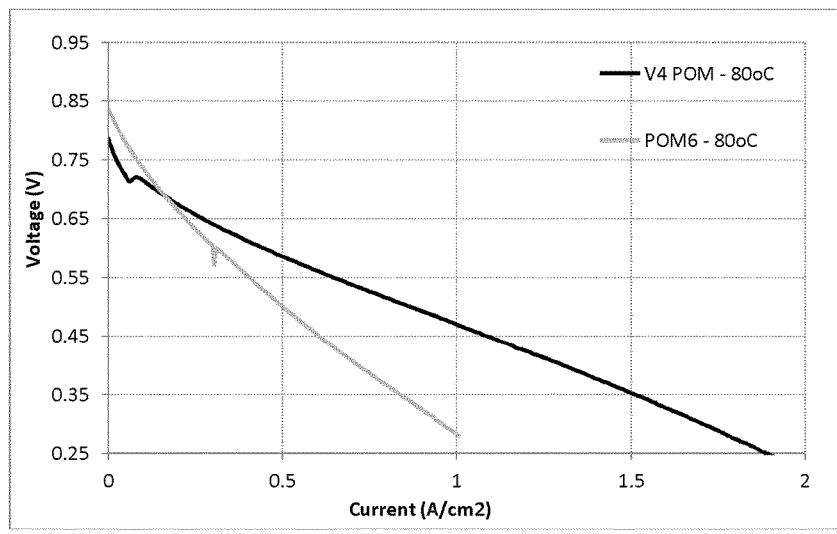
Figure 8:
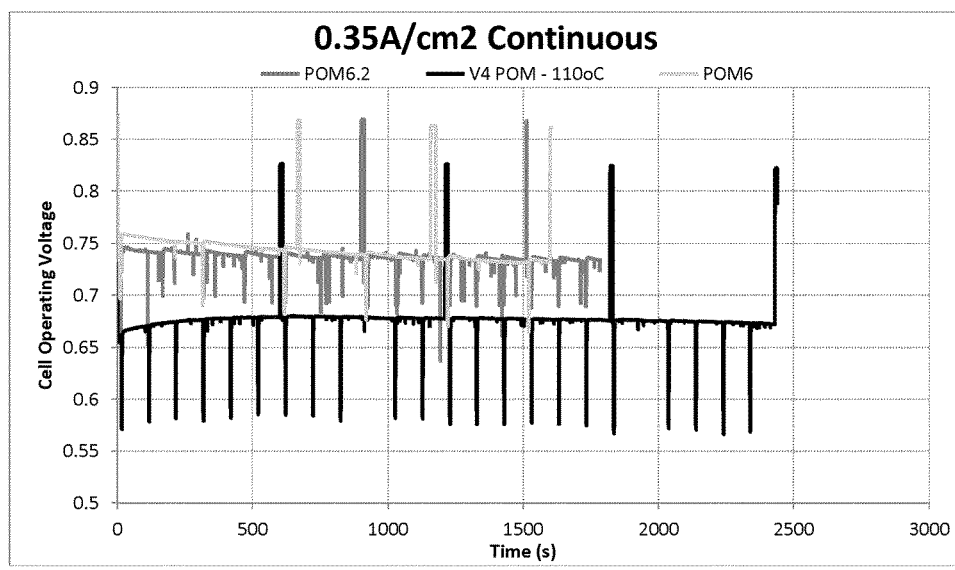

FIG. 7 illustrates the current/voltage data for $Na_4H_3PV_4Mo_8O_{40}$ at 0.3M and $H_{10}P_2V_4Mo_8O_{44}$ ("POM6") at 0.45M in a standard fuel cell at 80° C. and 1 atm pressure; and FIG. 8 illustrates the steady-state single cell performance data of $Na_4H_3PV_4Mo_8O_{40}$ at 0.3M compared with $H_{10}P_2V_4Mo_8O_{44}$ ("POM6") at 0.45M and $H_{10.75}P_{2.25}Mo_8V_4O_{45}$ ("POM6.2") at 0.3M at an elevated temperature (110° C.) and pressure (3 atm).

Figure 1:
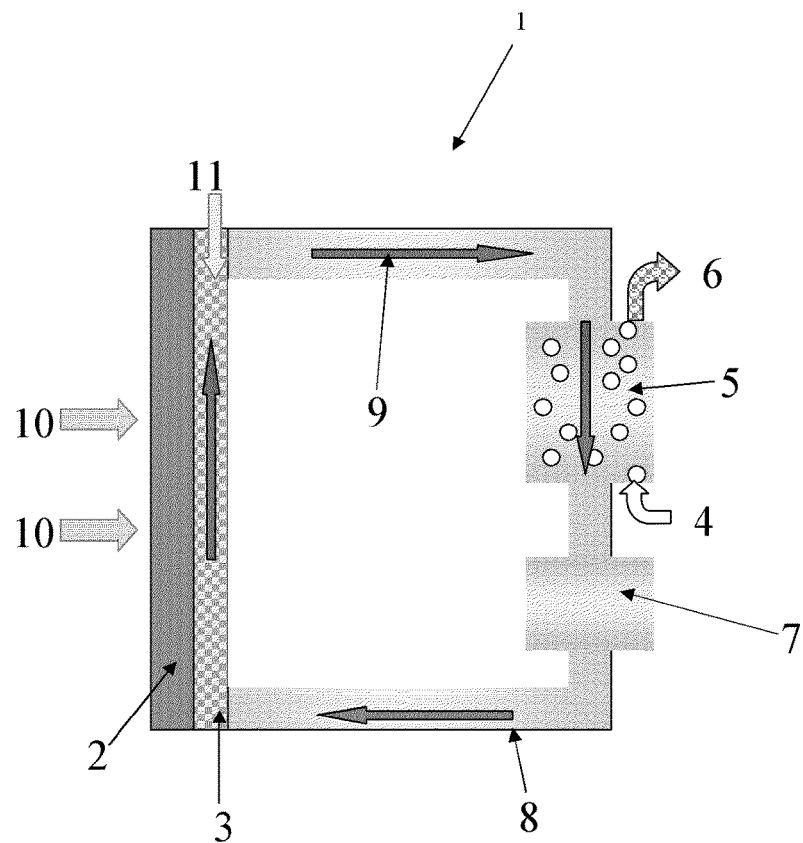
FIG. 1 illustrates a schematic view of the cathode compartment of a fuel cell in accordance with the present invention.

Referring to FIG. 1, there is shown the cathode side of fuel cell 1 in accordance with the invention comprising a polymer electrolyte membrane 2 separating an anode (not shown) from cathode 3. Cathode 3 comprises in this diagram reticulated carbon and is therefore porous. However, other cathodic materials such as platinum may be used. Polymer electrolyte membrane 2 comprises cation selective Nafion 112 membrane through which protons generated by the (optionally catalytic) oxidation of fuel gas (in this case hydrogen) in the anode chamber pass in operation of the cell. Electrons generated at the anode by the oxidation of fuel gas flow in an electrical circuit (not shown) and are returned to cathode 3. Fuel gas (in this case hydrogen) is supplied to the fuel gas passage of the anode chamber (not shown), while the oxidant (in this case air) is supplied to oxidant inlet 4 of cathode gas reaction chamber 5. Cathode gas reaction chamber 5 (the catalyst reoxidation zone) is provided with exhaust 6, through which the by-products of the fuel cell reaction (eg water and heat) can be discharged.

A catholyte solution comprising the oxidised form of the polyoxometallate redox catalyst is supplied in operation of the cell from catholyte reservoir 7 into the cathode inlet channel 8. The catholyte passes into reticulated carbon cathode 3, which is situated adjacent membrane 2. As the catholyte passes through cathode 3, the polyoxometallate catalyst is reduced and is then returned to cathode gas reaction chamber 5 via cathode outlet channel 9.

Due to the advantageous composition of the catholyte of the present invention, reoxidation of the catalyst occurs very rapidly, which allows the fuel cell to produce a higher sustainable current than with catholytes of the prior art.

FIGS. 2 to 6 were all created under the same experimental conditions. A fuel cell with a 25 cm² active area was used in conjunction with a polyoxometallate of structure $H_7PMo_8V_4O_{40}$. The cell comprised an anode gas diffusion layer 34BC, which was supplied by SGL. An anode-membrane assembly with a 25-μm thick membrane, supplied by W.L. Gore Ltd, was used. The cathode electrode was GFD2.5 graphite felt, supplied by SGL, compressed to about 1.15 mm thick. 650 ml of $H_7PMo_8V_4O_{40}$ catholyte was charged to the regenerator, a flow of 2 l/min of air was used during regeneration and 2 l/min of $N_2$ was used when holding the cell at a specific oxidation state.

Figure 2:
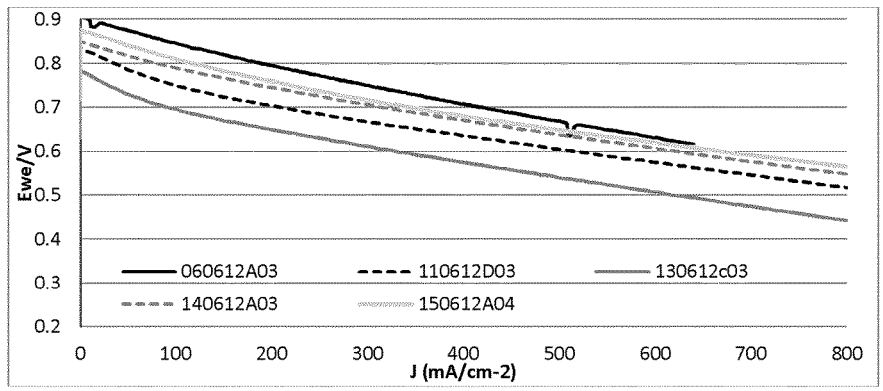
FIG. 2 illustrates charts demonstrating the performance of a fuel cell in accordance with the present invention over the entire test period.
Figure 2:
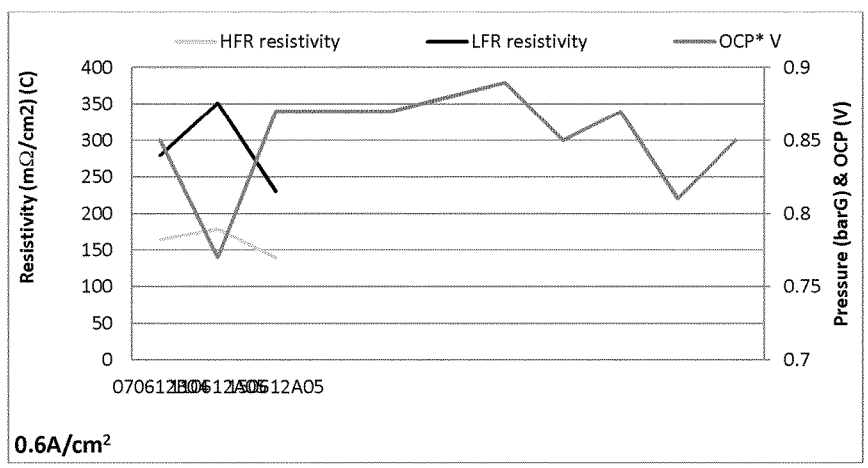

FIG. 2 demonstrates the durability of the cell over the entire test period (between 6 Jun. 2012 and 15 Jun. 2012). FIG. 2a shows the polarisation curves over the test period from various open circuit voltages (OCPs). The shape of the slopes in FIG. 2a remains almost constant throughout the test period with a small improvement seen in the slope of the linear portion improving between 6 Jun. 2012 and 11 Jun. 2012. This continuity indicates that the performance of the cell did not degrade during the test period. FIG. 2b shows the membrane and cell resistivity values obtained by Galvano-electrochemical impedance spectroscopy (GEIS) over the test period. The membrane resistivity (HFR) remains almost constant throughout the test period but there is a larger shift in the overall (LFR) resistance of the cell. Any change in resistance could be due to the OCP of the catholyte which can lead to shifts in its dynamic equilibrium and could also lead to a subsequent interaction with vanadium species and the membrane. It is therefore concluded that there is no loss in cell performance during the test period.

Figure 3:
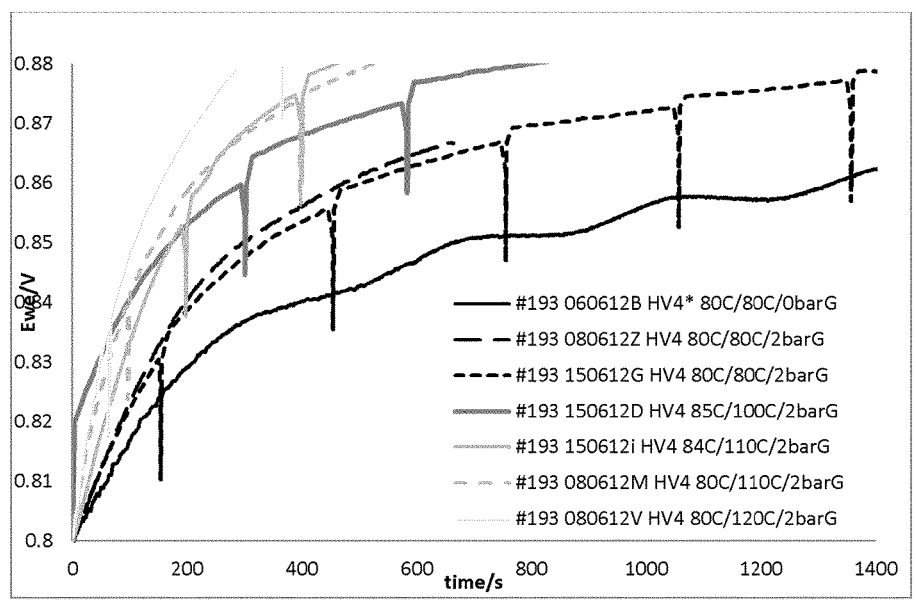
FIG. 3 illustrates a chart demonstrating the change in rate of regeneration of the polyoxometallate with changing temperature and pressure in the regeneration zone in a fuel cell in accordance with the present invention.

FIG. 3 demonstrates the regeneration curves where the temperature of the anode and cathode regions (Tc) is between 80 and 85° C., the temperature of the regeneration zone (Tr) varies between 80 and 120° C. and the pressure in the regeneration zone (Pr) varies between 0 and 2 barG (gauge pressure i.e. relative to ambient pressure). In order to separate anode/cathode region performance from the regeneration zone performance, testing of the two components was separated. The regeneration zone was tested by first reducing the catholyte in the fuel cell to an OCP of less than 0.8V. The $N_2$ sparge (at 2 l/min) was used under these conditions to ensure adequate mixing within the regeneration zone. The regeneration rate at various regeneration zone temperatures (Tr) was then measured at an open circuit voltage of between 0.8V and 0.88V with 2 l/min air feed to the regeneration zone when it is either at 0-0.3 barG or 1.95-2.05 barG pressure. When testing the regeneration zone, the temperature of the anode and the cathode regions (Tc) is maintained at 80° C.±7° C. The anode and cathode regions were tested by measuring the steady state voltage at 0.6A/cm$^2$ over a 1 hour period whilst varying the temperature of the anode and cathode regions (Tc) and maintaining the Tr at 110° C. (with 2 l/min air).

Under normal cell operation conditions (Tc=80° C./Tr=80° C./Pr=0 barG) it takes more than 4000s for the POM to regenerate from an OCP of 0.80V to an OCP of 0.88V. Once pressure is applied to the system the rate is much improved and reaches 0.88V within 1500s. FIG. 3 shows that at 2 barG pressure, subsequent improvements are seen with increased Tr. Once Tr reaches 120° C., it is possible to reach an OCP of 0.88V within 300s. Further, increasing the Tc at a Tr of 110° C. also results in a slightly improved performance. However, the increase is not as great as with increases in Tr.

Figure 4:
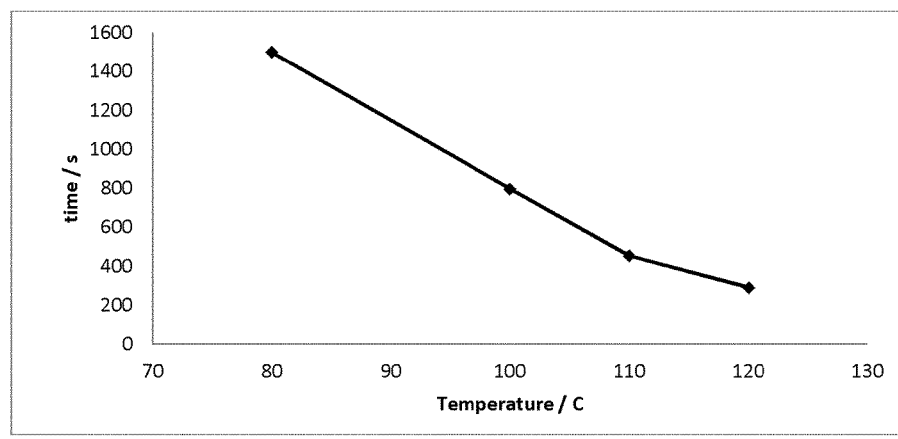
FIG. 4 illustrates a chart demonstrating the change in rate of regeneration with changing temperature in the regeneration zone in a fuel cell in to accordance with the present invention.

FIG. 4 demonstrates the time taken to reach an OCP of 0.88V from 0.8V where Tc is 80° C., Tr varies between 80 and 120° C. and Pr is maintained at 2 barG. Again, FIG. 4 shows that at 2 barG pressure, subsequent improvements are seen with increased Tr. Once Tr reaches 120° C., it is possible to reach an OCP of 0.88V within 300s.

Figure 5:
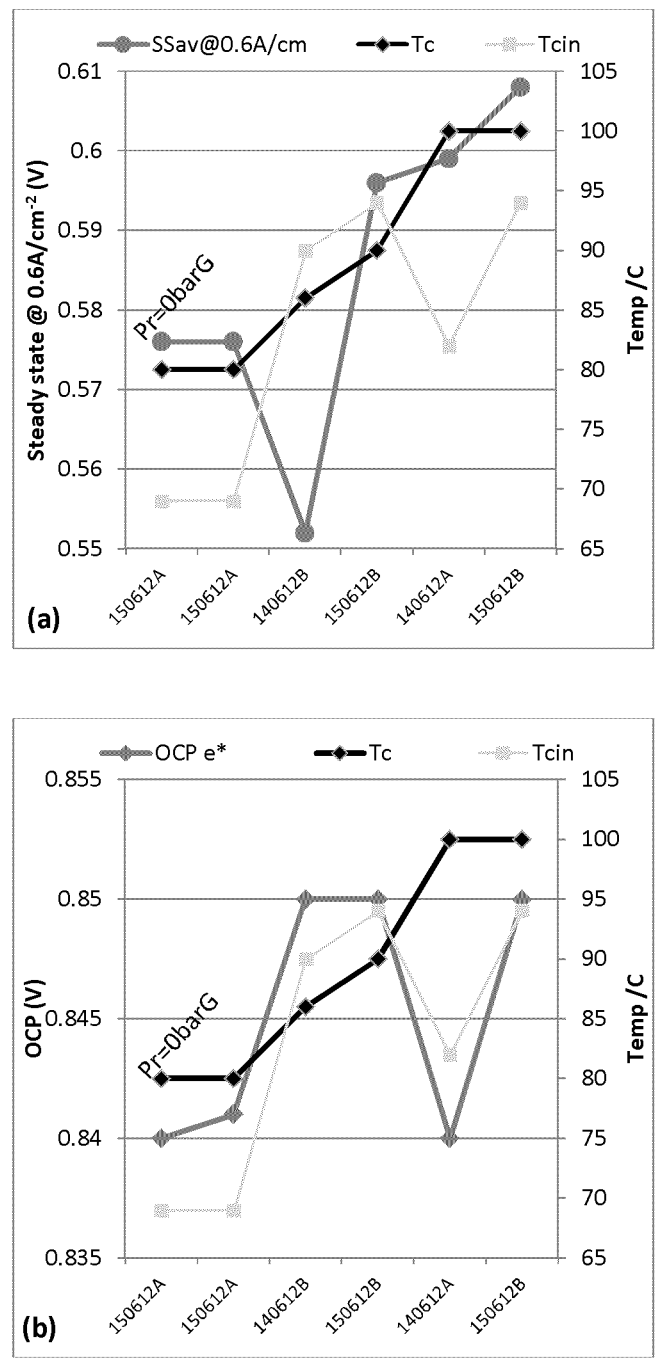
FIG. 5 illustrates charts showing the steady state performance of a fuel cell in accordance with the present invention at 600 mA/cm² as a function of anode/cathode region temperature.
Figure 6:
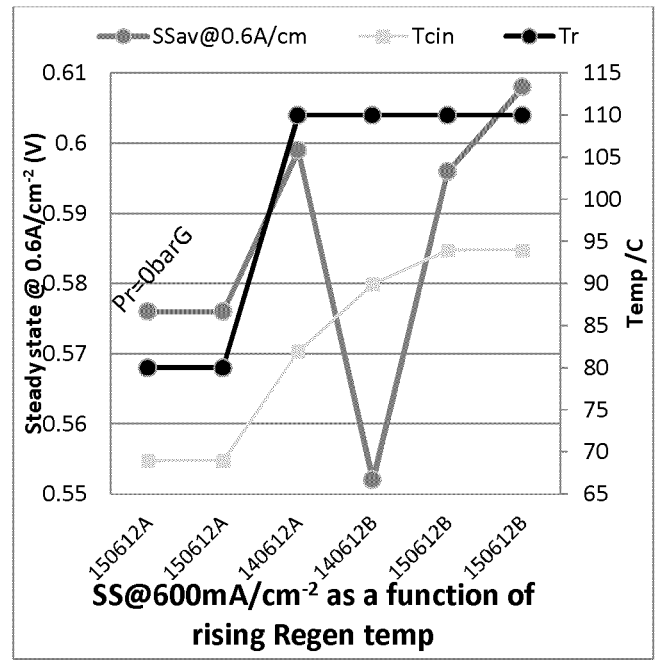
FIG. 6 illustrates charts showing the steady state performance of a fuel cell in accordance with the present invention at 600 mA/cm² as a function of the temperature of the regeneration zone.
Figure 6:
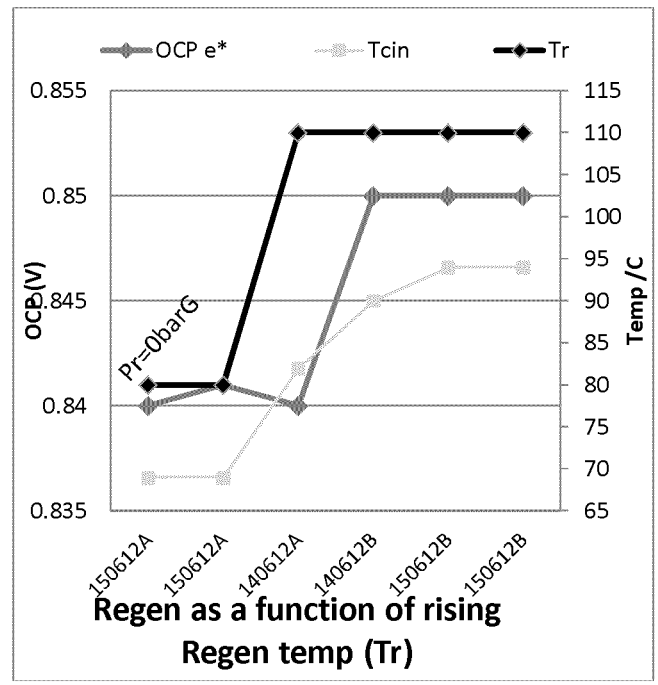

FIGS. 5 and 6 demonstrate the steady state performance at 600 mA/cm$^2$ as a function of Tc and Tr respectively. FIGS. 5a and 6a show that in general, steady state performance increases as a function of both Tc and Tr. Tcin is defined as the catholyte temperature just before it flows into the cell. The result obtained for 140612B could be due to dehydration of the POM which could have dented the performance. The concentration of the POM had gone down by around 90% during system operation according to the optical level; this level was corrected before 150612A was performed. FIGS. 5b and 6b do not indicate a rise in OCP during steady state operation with elevated temperature, which is not what is expected from the regeneration curves. This phenomenon is due to the fact that the OCP at a 'fixed' oxidation state rises as the POM catholyte temperature falls.

FIG. 7 shows the current/voltage data for a known polyoxometallate species ($Na_4H_3PV_4Mo_8O_{40}$ at 0.3M) and a preferred polyoxometallate species of the present invention "POM6" ($H_{10}P_2V_4Mo_8O_{44}$ at 0.45M) in a liquid flow cathode PEM fuel cell at 80° C. and 1 atm pressure. Under these conditions, the preferred polyoxometallate species of the present invention demonstrates a relatively poor performance compared to the known polyoxometallate species, particularly at higher current densities.

FIG. 8 shows the steady-state single cell performance data of a known polyoxometallate species ($Na_4H_3PV_4Mo_8O_{40}$ at 0.3M) compared with preferred polyoxometallate species of the present invention, "POM6" ($H_{10}P_2V_4Mo_8O_{44}$ at 0.45M) and "POM6.2" ($H_{10.75}P_{2.25}Mo_8V_4O_{45}$ at 0.3M) at an elevated temperature (110° C.) and pressure (3 atm). The data shows a further improvement in continuous operation with the application of only mildly increased temperature and pressure.

What is claimed is:

1. A redox fuel cell comprising an anode and a cathode separated by an ion selective polymer electrolyte membrane; a fuel supply to supply fuel to the anode; an oxidant supply to supply oxidant to the cathode; an electrical circuit provided between the anode and the cathode; a non-volatile catholyte solution flowing in fluid communication with the cathode, the catholyte solution comprising a polyoxometallate redox couple being at least partially reduced at the cathode in operation of the cell, and at least partially re-generated by reaction with the oxidant in a regeneration zone after such reduction at the cathode, the catholyte solution further comprising one or more vanadium species that result from the speciation of the polyoxometallate at an elevated temperature and/or an elevated pressure, wherein the polyoxometallate comprises at least one of $H_7PMo_8V_4O_{40}$, $H_{12}P_3Mo_{18}V_7O_{85}$, $H_{10}P_2V_4Mo_8O_{44}$, or $H_{10.75}P_{2.25}Mo_8V_4O_{45}$.

2. The redox fuel cell according to claim 1 wherein the speciation of the polyoxometallate occurs in situ.

3. The redox fuel cell according to claim 1 wherein the elevated temperature is no more than 120° C.

4. The redox fuel cell according to claim 1 wherein the elevated temperature is below the boiling point for the catholyte solution.

5. The redox fuel cell according to claim 1 wherein the elevated temperature is in the regeneration zone and/or in the cathode/anode region of the cell.

6. The redox fuel cell according to claim 5 wherein the elevated temperature is in the regeneration zone.

7. The redox fuel cell according to claim 1 wherein the elevated pressure is above ambient pressure.

8. The redox fuel cell according to claim 7 wherein the elevated pressure is around 2 barG pressure.

9. The redox fuel cell according to claim 1 wherein the elevated pressure is in the regeneration zone and/or in the cathode/anode region of the cell.

10. The redox fuel cell according to claim 9 wherein the elevated pressure is in the regeneration zone.

11. The redox fuel cell according to claim 1 wherein catholyte solution comprises at least one ancillary redox species.

12. The redox fuel cell according to claim 11 wherein the ancillary redox species is selected from ligated transition metal complexes, further polyoxometallate species, and combinations thereof.

13. The redox fuel cell according to claim 12 wherein the transition metal(s) in the transition metal complexes are selected from manganese in oxidation states II-V, iron I-IV, copper I-III, cobalt I-III, nickel I-III, chromium (II-VII), titanium II-IV, tungsten IV-VI, vanadium II-V and molybdenum II-VI.

14. The redox fuel cell according to claim 1 wherein the catholyte solution is substantially free from any ancillary redox species, other than the vanadium species.

15. A catholyte solution for use in a redox fuel cell according to claim 1.

16. The redox fuel cell according to claim 1 wherein the elevated temperature is in the regeneration zone and/or in the cathode/anode region of the cell.

17. The redox fuel cell according to claim 16 wherein the elevated temperature is in the regeneration zone.

18. The redox fuel cell according to claim 1 wherein the elevated pressure is above ambient pressure.

19. The redox fuel cell according to claim 18 wherein the elevated pressure is around 2 barG pressure.

20. The redox fuel cell according to claim 1 wherein the elevated pressure is in the regeneration zone and/or in the cathode/anode region of the cell.

21. The redox fuel cell according to claim 20 wherein the elevated pressure is in the regeneration zone.

22. The redox fuel cell according to claim 1, wherein the elevated temperature is above 80° C.

23. The redox fuel cell according to claim 1, wherein the elevated temperature is above 100° C.

24. The redox fuel cell according to claim 1, wherein both the elevated temperature and the elevated pressure are used.

* * * * *